(12) United States Patent
Atkins et al.

(10) Patent No.: US 10,982,551 B1
(45) Date of Patent: Apr. 20, 2021

(54) TURBOMACHINE BLADE

(71) Applicant: United Technologies Corporation, Farmington, CT (US)

(72) Inventors: Bryan C. Atkins, Southington, CT (US); Robert J. Esteve, Colchester, CT (US); Richard A. Lomenzo, Jr., Enfield, CT (US); David P. Houston, Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 389 days.

(21) Appl. No.: 15/871,266

(22) Filed: Jan. 15, 2018

Related U.S. Application Data

(63) Continuation-in-part of application No. 15/211,510, filed on Jul. 15, 2016, now Pat. No. 9,885,242, which is a continuation of application No. 13/854,354, filed on Apr. 1, 2013, now Pat. No. 9,394,793.

(60) Provisional application No. 62/447,085, filed on Jan. 17, 2017, provisional application No. 61/701,172, filed on Sep. 14, 2012.

(51) Int. Cl.
| | |
|---|---|
| *F01D 5/14* | (2006.01) |
| *F01D 5/16* | (2006.01) |
| *F01D 5/30* | (2006.01) |
| *F01D 5/18* | (2006.01) |

(52) U.S. Cl.
CPC .............. *F01D 5/16* (2013.01); *F01D 5/14* (2013.01); *F01D 5/141* (2013.01); *F01D 5/186* (2013.01); *F01D 5/30* (2013.01); *F05D 2220/32* (2013.01); *F05D 2240/30* (2013.01); *F05D 2260/202* (2013.01); *F05D 2300/175* (2013.01); *Y02T 50/60* (2013.01)

(58) Field of Classification Search
CPC . F01D 5/16; F01D 5/141; F01D 5/186; F01D 5/30; F01D 5/14; F05D 2240/30; F05D 2300/175; F05D 2220/32; F05D 2260/202; Y02T 50/673
See application file for complete search history.

(56) References Cited

U.S. PATENT DOCUMENTS

| | | | |
|---|---|---|---|
| 3,044,746 | A | 7/1962 | Stargardter |
| 3,367,629 | A | 2/1968 | Partington |
| 3,536,414 | A | 10/1970 | Smith, Jr. |
| 3,574,482 | A | 4/1971 | Savage et al. |
| 3,588,278 | A | 6/1971 | Ortolano et al. |
| 3,847,506 | A | 11/1974 | Straniti |

(Continued)

OTHER PUBLICATIONS

U.S. Office Action dated Sep. 4, 2015 for U.S. Appl. No. 13/854,354.

(Continued)

*Primary Examiner* — John C Hong
(74) *Attorney, Agent, or Firm* — Bachman & LaPointe, P.C.

(57) ABSTRACT

A turbomachine airfoil element has an airfoil. The airfoil has an inboard end, an outboard end, a leading edge, a trailing edge, a pressure side, and a suction side. A span between the inboard and an outboard end is 1.4-1.6 inch. A chord length at 50% span is 0.9-1.4 inch. The element is remanufactured by providing first, second, third, fourth, and fifth mode resonance frequencies respectively of 2591.5±10% Hz, 4675.2±10% Hz, 7892.9±10% Hz, 10098.2±10% Hz, and 14808.2±10% Hz.

22 Claims, 7 Drawing Sheets

(56) References Cited

U.S. PATENT DOCUMENTS

| | | | |
|---|---|---|---|
| 4,023,249 | A | 5/1977 | Darrow et al. |
| 4,097,192 | A | 6/1978 | Kulina |
| 4,321,311 | A | 3/1982 | Strangman |
| 4,719,080 | A | 1/1988 | Duhl et al. |
| 4,839,245 | A | 6/1989 | Sue et al. |
| 4,921,405 | A | 5/1990 | Wilson |
| 4,924,706 | A | 5/1990 | Moore |
| 5,160,242 | A | 11/1992 | Brown |
| 5,286,168 | A | 2/1994 | Smith |
| 5,344,510 | A | 9/1994 | Allen et al. |
| 5,490,764 | A | 2/1996 | Schilling |
| 5,915,452 | A | 6/1999 | Conroy et al. |
| 5,988,982 | A | 11/1999 | Clauer |
| 6,004,101 | A | 12/1999 | Schilling et al. |
| 6,033,186 | A | 3/2000 | Schilling et al. |
| 6,234,753 | B1 | 5/2001 | Lee |
| 6,339,878 | B1 | 1/2002 | Owen et al. |
| 6,354,780 | B1 | 3/2002 | Davis et al. |
| 6,532,656 | B1 | 3/2003 | Wilkins et al. |
| 6,814,543 | B2 | 11/2004 | Barb et al. |
| 7,444,802 | B2 | 11/2008 | Parry |
| 7,632,071 | B2 | 12/2009 | Charbonneau et al. |
| 7,718,280 | B2 | 5/2010 | Wilson |
| 7,824,147 | B2 | 11/2010 | Morris et al. |
| 8,043,063 | B2 | 10/2011 | Kelly et al. |
| 8,113,780 | B2 | 2/2012 | Cherolis et al. |
| 8,573,945 | B2 | 11/2013 | Wang et al. |
| 8,602,740 | B2 | 12/2013 | O'Hearn et al. |
| 8,863,491 | B2 | 10/2014 | Merry et al. |
| 8,944,762 | B2 | 2/2015 | Suciu et al. |
| 8,950,069 | B2 | 2/2015 | Ress, Jr. |
| 9,394,793 | B1 | 7/2016 | Atkins et al. |
| 9,506,347 | B2 | 11/2016 | Key |
| 10,215,189 | B2 | 2/2019 | Dutka et al. |
| 2002/0064458 | A1 | 5/2002 | Montgomery et al. |
| 2005/0135928 | A1 | 6/2005 | Servadio et al. |
| 2005/0254955 | A1 | 11/2005 | Helder et al. |
| 2006/0073022 | A1 | 4/2006 | Gentile et al. |
| 2006/0280606 | A1 | 12/2006 | Busbey et al. |
| 2007/0084582 | A1 | 4/2007 | Govern et al. |
| 2007/0175032 | A1 | 8/2007 | Kurt-Elli |
| 2008/0286108 | A1 | 11/2008 | Lui et al. |
| 2009/0155082 | A1 | 6/2009 | Duong et al. |
| 2010/0129554 | A1 | 5/2010 | Ahmad |
| 2010/0239422 | A1 | 9/2010 | Reyes et al. |
| 2011/0116145 | A1 | 5/2011 | Fujii et al. |
| 2011/0268562 | A1 | 11/2011 | Knight, III et al. |
| 2011/0293436 | A1 | 12/2011 | Di Florio et al. |
| 2012/0057982 | A1 | 3/2012 | O'Hearn et al. |
| 2012/0082556 | A1 | 4/2012 | Macchia et al. |
| 2012/0308390 | A1 | 12/2012 | Asai et al. |
| 2013/0149132 | A1 | 6/2013 | Webster |
| 2014/0248129 | A1 | 9/2014 | Merry et al. |
| 2014/0259589 | A1 | 9/2014 | Xu et al. |
| 2015/0040582 | A1 | 2/2015 | Dong et al. |
| 2015/0089809 | A1 | 4/2015 | Guo et al. |
| 2015/0114002 | A1 | 4/2015 | Schwarz et al. |
| 2015/0198047 | A1 | 7/2015 | Roche |
| 2015/0285085 | A1 | 10/2015 | Bentley |
| 2015/0328717 | A1 | 11/2015 | Shepler et al. |
| 2015/0345297 | A1 | 12/2015 | Neubrand et al. |
| 2016/0024971 | A1 | 1/2016 | Pearce et al. |
| 2016/0208741 | A1 | 7/2016 | Sabnis |
| 2016/0222978 | A1 | 8/2016 | Drozdenko et al. |
| 2016/0319670 | A1* | 11/2016 | Atkins ............ F01D 5/14 |
| 2017/0276070 | A1 | 9/2017 | Nolcheff et al. |
| 2017/0292530 | A1 | 10/2017 | Pope |
| 2019/0017393 | A1* | 1/2019 | Iurisci ............ F01D 5/22 |

OTHER PUBLICATIONS

U.S. Office Action dated Sep. 21, 2016 for U.S. Appl. No. 15/211,510.
U.S. Office Action dated Apr. 25, 2017 for U.S. Appl. No. 15/211,510.
U.S. Office Action dated Aug. 7, 2019 for U.S. Appl. No. 15/871,518.
U.S. Office Action dated Apr. 15, 2020 for U.S. Appl. No. 15/871,518.
U.S. Office Action dated May 14, 2019 for U.S. Appl. No. 15/871,260.
U.S. Office Action dated Nov. 26, 2019 for U.S. Appl. No. 15/871,260.
U.S. Office Action dated Jul. 25, 2019 for U.S. Appl. No. 15/871,323.
U.S. Office Action dated Apr. 8, 2020 for U.S. Appl. No. 15/871,323.
U.S. Office Action dated Aug. 29, 2019 for U.S. Appl. No. 15/871,491.
U.S. Office Action dated Apr. 10, 2020 for U.S. Appl. No. 15/871,491.
U.S. Office Action dated Oct. 3, 2019 for U.S. Appl. No. 15/871,505.
U.S. Office Action dated Feb. 28, 2020 for U.S. Appl. No. 15/871,505.
R.S. Mohan et al., "Vibration Analysis of a Steam Turbine Blade", INTER-NOISE and NOISE-CON Congress and Conference Proceedings, Nov. 2014, vol. 249. No. 7, Institute of Noise Control Engineering, Washington, DC.
Warner L. Stewart et al., "Blade Design, Turbine Design and Application", Chapter 4, pp. 101-125, Jun. 1994, NASA, Washington, D.C.
Tsu-Chien Cheu et al., "Design Optimization of Gas Turbine Blades with Geometry and Natural Frequency Constraints", Conference Paper, Gas Turbine and Aeroengine Conference, Jun. 1988, American Society of Mechanical Engineers, New York, NY.
Ujjawal A. Jaiswal et al., Design and Analysis of Stator, Rotor and Blades of the Axial flow Compressor, Aug. 2014, vol. 1, Issue 1, International Journal of Engineering Development and Research, India.
FAA, Advisory Circular 33.83A, Sep. 29, 2006, Federal Aviation Administration, Washington, D.C.
FAA Advisory Circular 33.83-1, Comparative Method to Show Equivalent Vibratory Stresses and High Cycle Fatigue Capability for Parts Manufacturer Approval of Turbine Engine and Auxiliary Power Unit Parts, Sep. 8, 2009, Federal Aviation Administration, Washington, D.C.
B.J. Peters et al., "Investigation of Advanced Processed Single-Crystal Turbine Blade Alloys", Dec. 1995, NASA Report, United Technologies Corporation, West Palm Beach, FL.
"High Temperature High-Strength Nickel Base Alloys", May 1995, Nickel Development Institute, Toronto, Canada.
Matweb, "Titanium Ti—6Al—4V (Grade 5), Annealed", MatWeb, LLC, Blacksburg, Virginia, retrieved from internet http://www.matweb.com/search/datasheetaspx?MatGUID=a0655d261898456b958e5f825ae85390, Aug. 23, 2019.
Nageswara Rao Muktinutalapati, "Materials for Gas Turbines—An Overview", Advances in Gas Turbine Technology, Ernesto Benini editor, Nov. 2011, pp. 293-314, Intech, Rijeka, Croatia.
"Inconel Alloy 718", Sep. 2007, Special Metals Corporation, New Hartford, New York.
"6061 aluminum alloy", Feb. 2014, Wikipedia retrieved from internet https://web.archive.org/web/20140205075632/https://en.wikipedia.org/wiki/6061_aluminum_alloy, Sep. 16, 2019.
Leye M. Amoo, "On the Design and Structural Analysis of Jet Engine Fan Blade Structures", Progress in Aerospace Sciences, Jul. 2013, pp. 1-11, vol. 60, Elsevier, Amsterdam, Netherlands.
"ASM Aluminum 7075-16", ASM Aerospace Specification Metals Inc., Metals Handbook, 1990, vol. 2, ASM Material Data Sheet, ASM, Materials Park, Ohio, reprinted by MatWeb, LLC, Blacksburg, Virginia, retrieved from internet http://asm.matweb.com/search/SpecificMaterial.asp?bassnum=MA7075T6, Aug. 28, 2019.
"Inconel 718 Technical Data", Mar. 7, 2015, High Temp Metals, Sylmar, California, retrieved from internet https://web.archive.org/web/20150307164326/http://www.hightempmetals.com/techdata/hitempinconel718data.php, May 23, 2019.
AZOM, "Titanium Alloys-Physical Properties", Apr. 2002, Special Metals Corporation, New Hartford, New York, retrived from internet https://www.azom.com/article.aspx?articleid=1341, Jun. 3, 2019.
Kurt B. Hinkle, "An Automated Method for Optimizing Compressor Blade Tuning", Thesis, Mar. 2016, Brigham Young University, Provo, Utah.

* cited by examiner (EB1 MODE)

(T MODE)

(SWB1 MODE)

(EB1 MODE)

(T MODE)

(SWB1 MODE)

(EB1 MODE)

(EB2 MODE)

(EB3 MODE)

TURBOMACHINE BLADE

CROSS-REFERENCE TO RELATED APPLICATIONS

Benefit is claimed of U.S. Patent Application No. 62/447,085, filed Jan. 17, 2017, and entitled "Turbomachine Blade", the disclosure of which is incorporated by reference herein in its entirety as if set forth at length, and this application is a continuation-in-part of U.S. patent application Ser. No. 15/211,510, filed Jul. 15, 2016, and entitled "Turbomachine Blade", the disclosure of which is incorporated by reference herein in its entirety as if set forth at length, which is a continuation application of U.S. patent application Ser. No. 13/854,354, filed Apr. 1, 2013, and entitled "Turbomachine Blade", now U.S. Pat. No. 9,394,793 issued Jul. 19, 2016, the disclosure of which application and patent is incorporated by reference herein in its entirety as if set forth at length and benefit is claimed of U.S. Patent Application Ser. No. 61/701,172, filed Sep. 14, 2012, and entitled "Turbomachine Blade", the disclosure of which is incorporated by reference herein in its entirety.

BACKGROUND

The disclosure relates to turbomachinery. More particularly, the disclosure relates to blades of gas turbine engines.

Gas turbine engine blades and vanes are subject to a number of performance-affecting conditions. They are subject to environmental exposure and thermal and mechanical loading. These factors are most significant in the context of turbine components wherein the environment comprises combustion gases and thermal exposure is high. For blades, rotational forces are an important dynamic stimulus.

Vibrational responses also reflect how components interact with each other. An exemplary vibrational testing method is defined in Unites States Federal Aviation Administration (FAA) Advisory Circular 38.83-1 (Sep. 8, 2009). Vibrational response of turbine blades may be designed of further basic parameters such as airfoil geometry and attachment configuration. Proper design prolongs the useful life of engine equipment.

SUMMARY

One aspect of the disclosure involves a turbomachine airfoil element having an airfoil. The airfoil has an inboard end, an outboard end, a leading edge, a trailing edge, a pressure side, and a suction side. A span between the inboard and an outboard end is 1.4-1.6 inch (36-41 mm). A chord length at 50% span is 0.9-1.4 inch (23-36 mm). At least three of the following resonance frequencies are present. A first mode resonance frequency is 2591.5±10% Hz. A second mode resonance frequency is 4675.2±10% Hz. A third mode resonance frequency is 7892.9±10% Hz. A fourth mode resonance frequency is 10098.2±10% Hz. A fifth mode resonance frequency is 14808.2±10% Hz.

In additional or alternative embodiments of any of the foregoing embodiments, all of said first, second, third, fourth, and fifth mode resonance frequencies are present.

In additional or alternative embodiments of any of the foregoing embodiments: the first mode is a 1EB; the second mode is a 1SWB mode; the third mode is a 1T mode; the fourth mode is an 2EB mode; and the fifth mode is a 2T mode.

In additional or alternative embodiments of any of the foregoing embodiments, a sixth mode resonance frequency is 16667.5±10% Hz.

In additional or alternative embodiments of any of the foregoing embodiments, said resonance frequencies are at zero speed and ambient conditions.

In additional or alternative embodiments of any of the foregoing embodiments: at a running speed/condition, the first mode resonance frequency is 2585.4±10% Hz; a second mode resonance frequency is 4590.1±10% Hz; a third mode resonance frequency is 7625.9±10% Hz; a fourth mode resonance frequency is 9848.0±10% Hz; and a fifth mode resonance frequency is 14385.1±10% Hz.

In additional or alternative embodiments of any of the foregoing embodiments, the element is a blade having an inboard attachment root.

In additional or alternative embodiments of any of the foregoing embodiments, the outboard end is a free tip.

In additional or alternative embodiments of any of the foregoing embodiments, the element being a casting.

In additional or alternative embodiments of any of the foregoing embodiments, the element is formed of a nickel-based superalloy.

In additional or alternative embodiments of any of the foregoing embodiments, the element comprises a cooling passageway system in the airfoil.

In additional or alternative embodiments of any of the foregoing embodiments, the cooling passageway system comprises one or more inlets; and one or more outlets.

In additional or alternative embodiments of any of the foregoing embodiments: a first mode resonance frequency is 2591.5±5% Hz; a second mode resonance frequency is 4675.2±5% Hz; a third mode resonance frequency is 7892.9±5% Hz; a fourth mode resonance frequency is 10098.2±5% Hz; and a fifth mode resonance frequency is 14808.2±5% Hz.

Another aspect of the disclosure involves an airfoil element for a turbomachine, the airfoil element comprising: plural cavities, wherein the cavities are span-wise extending and are cord-wise adjacent, said cavities disposed between a leading edge and a trailing edge of the airfoil, and at least two of said plural cavities are separated by an airfoil rib structure; the airfoil having plural modes, including: one or more easywise bending modes, corresponding to bending parallel to the airfoil radial span, and including a first easywise bending mode at 2591.5±10% Hz and/or a second easywise bending mode at 10098.2±10% Hz; one or more stiffwise bending modes, corresponding to bending that is substantially normal to the easywise bending, and including a first stiffwise bending mode at 4675.2±10% Hz; and one or more twist modes, corresponding to twisting about an airfoil radial axis, and including a first twist mode occurring at 7892.9±10% Hz and/or a second twist mode occurring at 14808.2±10% Hz.

In additional or alternative embodiments of any of the foregoing embodiments, the one or more easywise bending modes includes said first and second easywise bending modes.

In additional or alternative embodiments of any of the foregoing embodiments, the one or more twist modes includes said first and second twist modes.

In additional or alternative embodiments of any of the foregoing embodiments, where a span between the inboard end and the outboard end is 1.4 to 1.6 inches (36-41 mm).

In additional or alternative embodiments of any of the foregoing embodiments, where a chord length, at 50% span, is 0.9 to 1.4 inches (23-36 mm).

Another aspect of the disclosure involves an airfoil element for a turbomachine, the airfoil element comprising: an inboard end; an outboard end; a leading edge; a trailing edge; a pressure side; and a suction side. A span between the inboard end and the outboard end is 1.4-1.6 inch (36-41 mm). A chord length at 50% span is 0.9-1.4 inch (23-36 mm). At least five of the following resonance frequencies are present. A first mode resonance frequency is 2585.4±10% Hz. A second mode resonance frequency is 4590.1±10% Hz. A third mode resonance frequency is 7625.9±10% Hz. A fourth mode resonance frequency is 9848.0±10% Hz. A fifth mode resonance frequency is 14385.1±10% Hz.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 15:
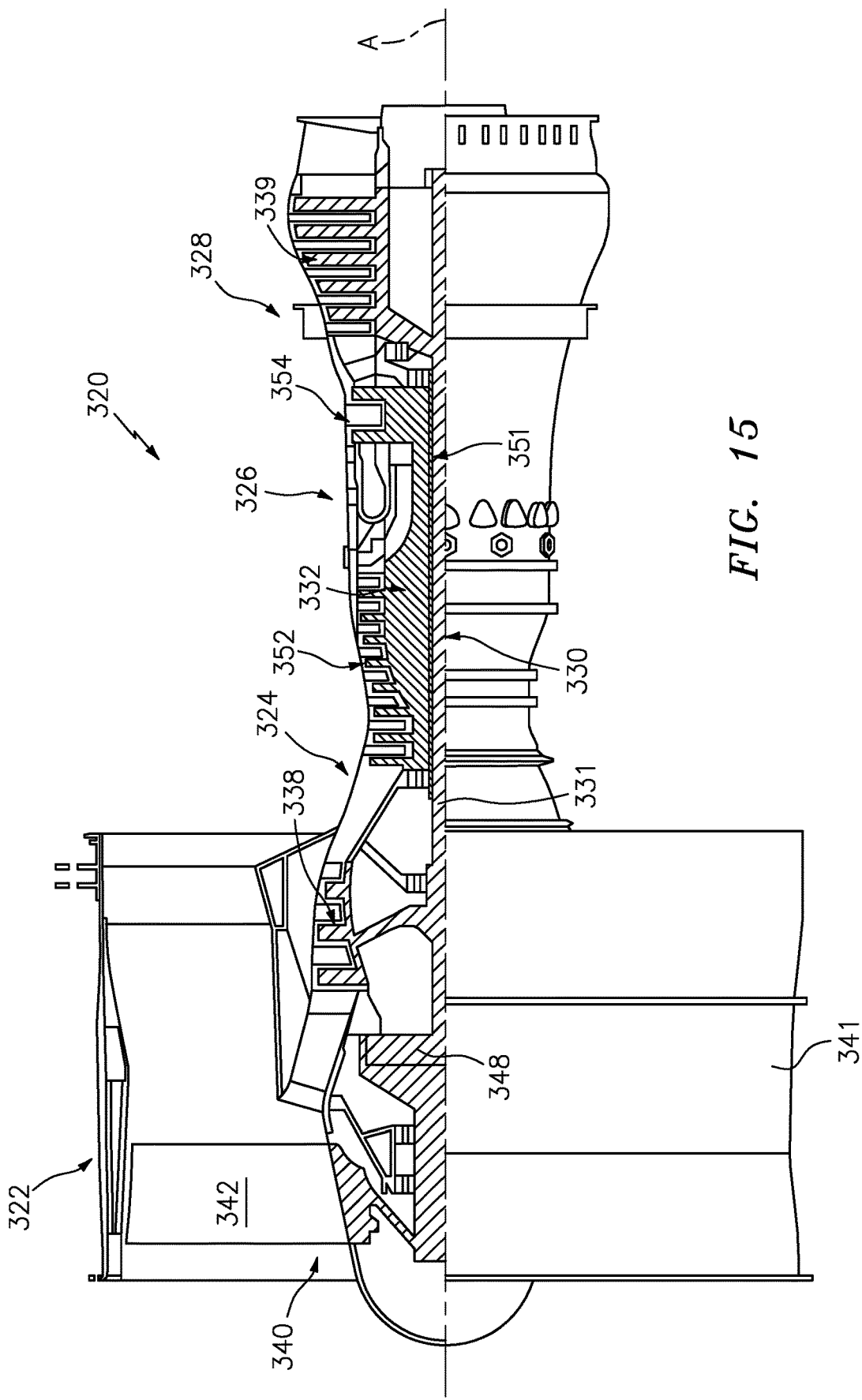
FIG. 15 is a schematic sectional view of a turbofan engine.

FIG. 15 schematically illustrates a gas turbine engine 320. The exemplary gas turbine engine 320 is a two-spool turbofan engine that generally incorporates a fan section 322, a compressor section 324, a combustor section 326 and a turbine section 328. Alternative engines might include an augmenter section (not shown) among other systems or features. The fan section 322 drives an inlet airflow to split with a bypass portion being driven along an outboard bypass flow path, while the core portion is further driven by the compressor section 324 along a core flow path for compression and communication into the combustor section 326. The hot combustion gases generated in the combustor section 326 are expanded through the turbine section 328. Although depicted as a turbofan gas turbine engine in the disclosed non-limiting embodiment, it should be understood that the concepts described herein are not limited to turbofan engines and these teachings could extend to other types of engines, including but not limited to, geared turbine engines having a geared architecture 348, three-spool engine architectures, and ground-based engines.

The exemplary fan section comprises a fan case 341 surrounding a fan 340 which comprises a circumferential array of fan blades 342. In the exemplary two-spool engine, the low pressure spool 330 comprises a shaft 331 joining the low pressure compressor (LPC) section 338 to the low pressure turbine (LPT) section 339. Similarly, the high speed spool 332 comprises a shaft 351 coupling the high pressure compressor section 352 to the high pressure turbine section 354.

In a non-limiting embodiment, the FIG. 15 gas turbine engine 320 is a high-bypass geared aircraft engine. In a further example, the gas turbine engine 320 bypass ratio is greater than about six (6:1). The geared architecture 348 can include an epicyclic gear train, such as a planetary gear system or other gear system. The example epicyclic gear train has a gear reduction ratio of greater than about 2.3, and in another example is greater than about 2.5:1. The exemplary geared architecture transmits driving torque from the low pressure spool to the fan with a geared reduction. The geared turbofan enables operation of the low speed spool 330 at higher speeds, which can increase the operational efficiency of the low pressure compressor 338 and low pressure turbine 339 and render increased pressure in a fewer number of stages.

The pressure ratio of the low pressure turbine 339 can be pressure measured prior to the inlet of the low pressure turbine 339 as related to the pressure at the outlet of the low pressure turbine 339 and prior to an exhaust nozzle of the gas turbine engine 320. In one non-limiting embodiment, the bypass ratio of the gas turbine engine 320 is greater than about ten (10:1), the fan diameter is significantly larger than that of the low pressure compressor 338, and the low pressure turbine 339 has a pressure ratio that is greater than about five (5:1). It should be understood, however, that the above parameters are only exemplary of one embodiment of a geared architecture engine and that the present disclosure is applicable to other gas turbine engines, including direct drive turbofans.

In this embodiment of the exemplary gas turbine engine 320, a significant amount of thrust is provided by the bypass flow path due to the high bypass ratio. The fan section 322 of the gas turbine engine 320 is designed for a particular flight condition—typically cruise at about 0.8 Mach and about 35,000 feet. This flight condition, with the gas turbine engine 320 at its best fuel consumption, is also known as bucket cruise thrust specific fuel consumption (TSFC). TSFC is an industry standard parameter of fuel consumption per unit of thrust.

Fan pressure ratio (FPR) is the pressure ratio across a blade of the fan section 322 without the use of a fan exit guide vane (FEGV) system. The low fan pressure ratio according to one non-limiting embodiment of the example gas turbine engine 320 is less than 1.45. Low corrected fan tip speed (LCFTS) is the actual fan tip speed divided by an industry standard temperature correction of $[(\text{Tram } ° \text{ R})/(518.7° \text{ R})]^{0.5}$. The low corrected fan tip speed according to one non-limiting embodiment of the example gas turbine engine 320 is less than about 1150 fps (350 m/s).

Figure 1:
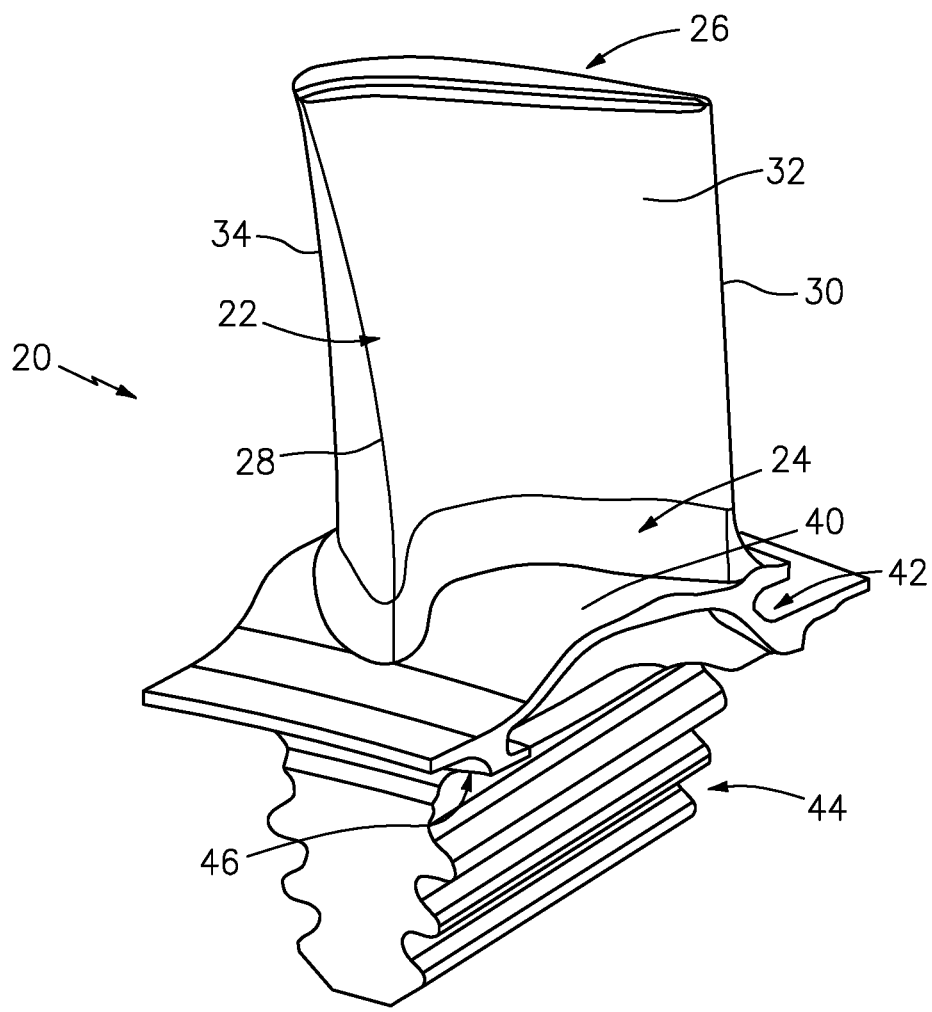
FIG. 1 is a view of a turbine blade.

Turning now to FIG. 1, an engine turbine element 20 is illustrated as a blade having an airfoil 22 which extends between an inboard end 24, and an opposing outboard end 26 (e.g., at a free tip), a distance therebetween extending substantially in the engine radial direction. The airfoil also includes a leading edge 28 and an opposing trailing edge 30. A pressure side 32 and an opposing suction side 34 extend between the leading edge 28 and trailing edge 30.

The airfoil inboard end is disposed at the outboard surface 40 of a platform 42. An attachment root 44 extends radially inward from the underside 46 of the platform.

The turbine blade is cast of a high temperature nickel-based superalloy, such as a Ni-based superalloy, for example, PWA 1484, which is a nickel base single crystal alloy. The superalloy has a density of approximately 0.32 pounds per cubic inch (8.86 g/cm$^3$), more broadly 0.30-0.34 pounds per cubic inch (8.3-9.4 g/cm$^3$). In addition, the material has a modulus of elasticity of approximately 18E06 psi (1.2E05 MPa), more broadly 16-20E06 psi (1.1-1.4E05 MPa) at room temperature.

Figure 2:
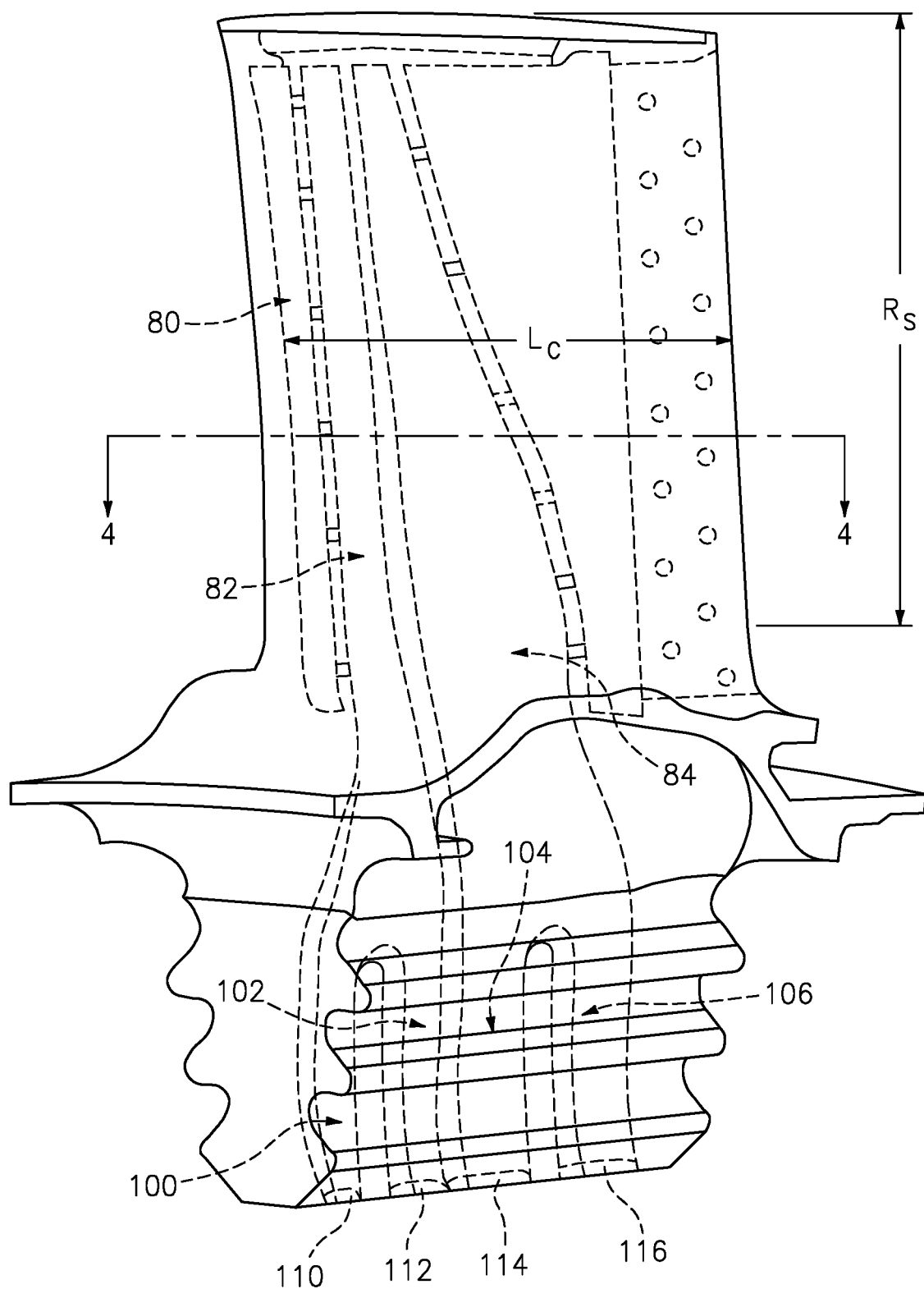
FIG. 2 is an X-ray pressure side view of the blade of FIG. 1.
Figure 3:
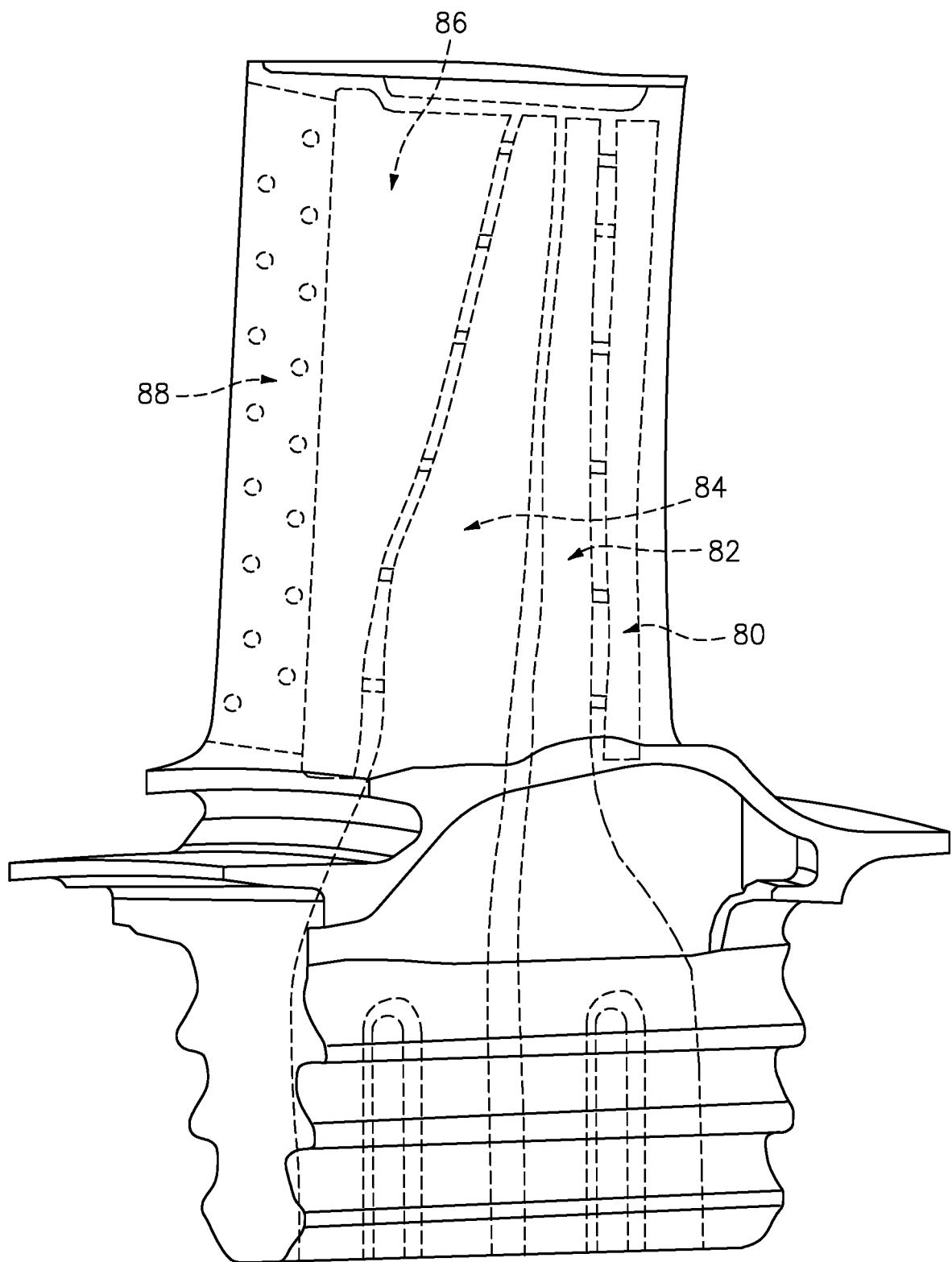
FIG. 3 is an X-ray suction side view of the blade of FIG. 1.
Figure 4:
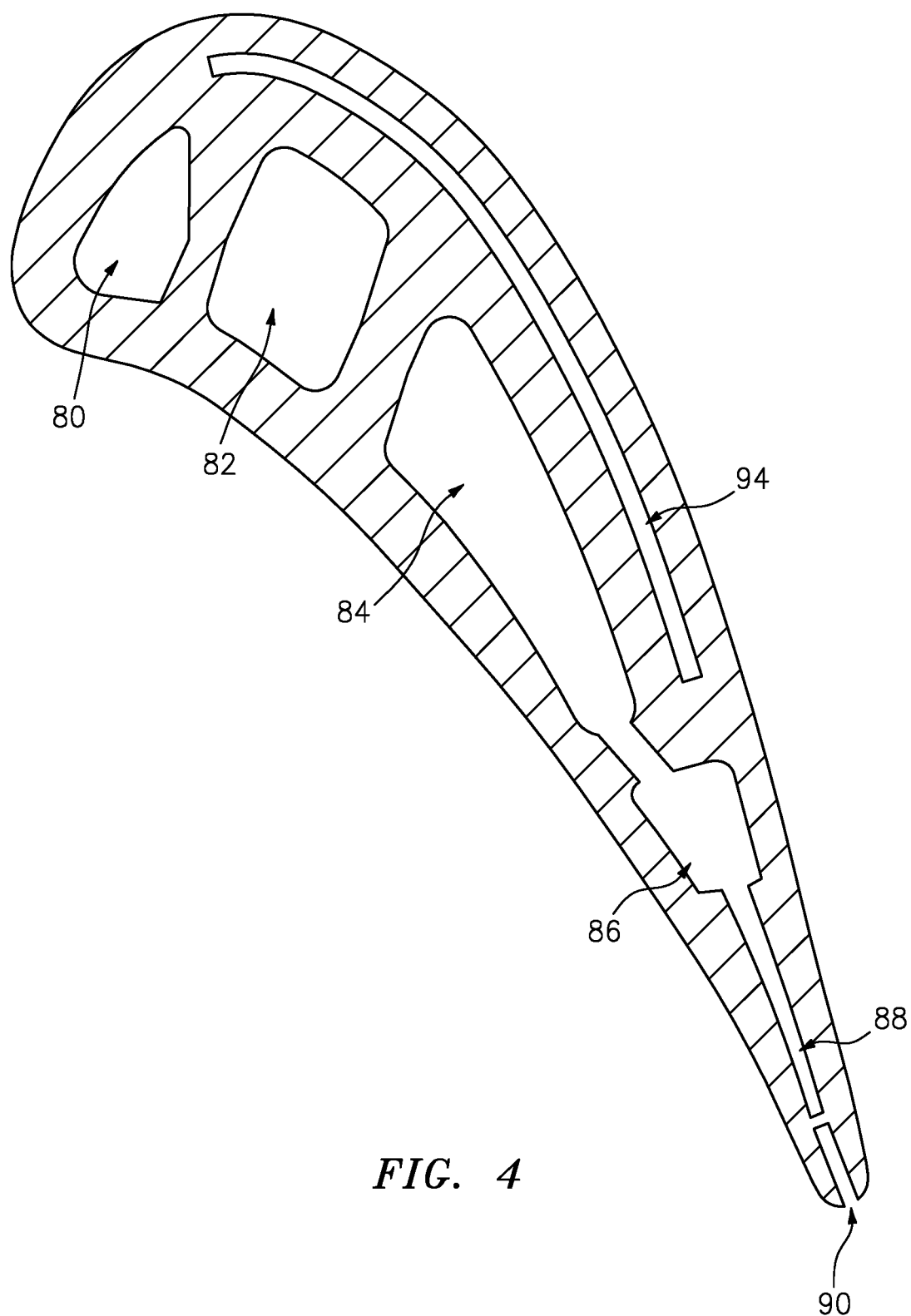
FIG. 4 is a transverse sectional view of the blade of FIG. 1.

The blade may also have a thermal barrier coating (TBC, e.g. one or more layer ceramic atop of one or more layer bondcoat) system along at least a portion of the airfoil. FIGS. 2-4 show further details of the blade. FIG. 2 shows an airfoil radial span $R_S$ and a chord length $L_C$. $R_S$ may be defined as the minimum radial distance between the radially outboardmost portion of the platform and the tip (e.g., the outboard end 26). $L_C$ may be defined as the distance from the leading edge to the trailing edge at about 50% span. For example, $R_S$ is 1.48 inches (37.6 mm) and $L_C$ is 1.01 inches (26.0 mm). More broadly, $R_S$ is 1.4-1.6 inches (36.0-41.0 mm) and $L_C$ is 0.9-1.4 inches (23.0-36.0 mm).

The blade has an internal cooling passageway system extending from one or more inlets along a root to a plurality of outlets (along or mostly along the airfoil). FIG. 4 schematically shows spanwise passageways from the leading edge to the trailing edge, which include: a tip impingement cavity/passageway 80, a first radial feed passageway 82, a second radial feed passageway 84, and a trailing edge impingement passageway 86. A trailing edge discharge slot 88 extends from the trailing edge impingement passageway 86 to an outlet 90 at, or near, the actual trailing edge of the blade.

The blade further includes suction side radial flow passageways 94 (e.g., a microcircuit). Additional outlets (e.g., cast or drilled holes) are not shown but may be present.

The blade also includes a plurality of feed trunks 100, 102, 104, and 106 extending from respective inlets 110, 112, 114, and 116 at the inner diameter (ID) face of the root. The trunks 100 and 112 merge outboard in the root to feed the leading feed passageway and impingement passageway 80. The trunks 104 and 106 similarly merge to feed the passageway 84.

The passageway 84 spanwise decreases from the inboard end of the airfoil to the outboard end with a complementary increase in span of the impingement cavity 86. Spanwise arrays of impingement holes extend along impingement walls respectively separating the feed passageway 82 from the feed impingement passageway 80 and the feed passageway 84 from the impingement passageway 86. Additionally, various surface enhancements such as posts and pedestals may be provided along the passageways to facilitate heat transfer.

A resonant condition is where a frequency of the excitation coincides with a resonance frequency of the blade, and may result in high vibratory stress. The blade has a resonance profile. There are various modes of resonance, each with its associated resonant frequency. As for blades, six vibratory modes primarily reflect how the blades interact with each other, and with other components of the engine.

A first type of mode is easywise bending (EB). A blade airfoil can be approximated as a right parallelepiped whose longest dimension is its radial span, that is, extending in the radial direction for the engine. Its middle dimension is its chord length, and its shortest dimension is its thickness. The easywise bending is parallel to the shortest dimension.

Figure 6:
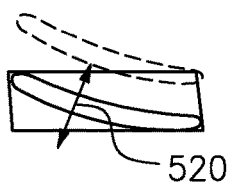
FIG. 6 is an inward view of the blade of FIG. 5 with one vibrational extreme shown in broken lines.
Figure 5:
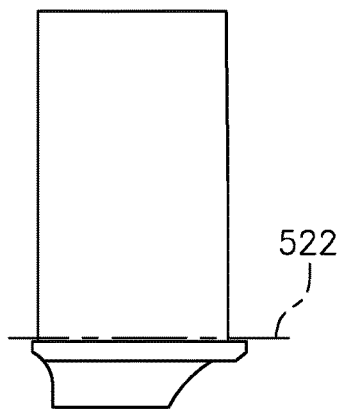
FIG. 5 is a schematic side view of a blade showing a first easywise bending mode node line.
Figure 7:
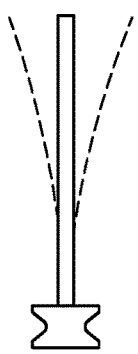
FIG. 7 is a front view of the blade of FIG. 5 with both vibrational extremes shown in broken lines.
Figure 8:
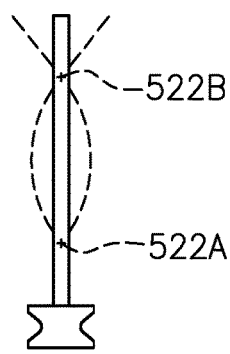
FIG. 8 is a front view of a blade with second easywise bending mode extremes shown in broken lines.
Figure 9:
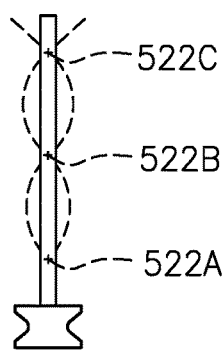
FIG. 9 is a front view of a blade with third easywise bending mode extremes shown in broken lines.

FIGS. 5-9 show easywise bending, though such bending in the plan view of FIG. 5 is somewhat less easy to observe. A first EB mode (EB1 or 1EB; FIG. 7) is the EB mode of longest wavelength and shortest frequency. A second EB mode, or 2EB (EB2; FIG. 8) deflection, is predominantly along the radial trailing edge of the airfoil. The mode has one portion of the airfoil moving toward the pressure side and another toward the suction side, changing direction for each cycle of vibration.

FIG. 6 shows bi-directional movement in the direction 520 with a neutral condition, that is, without deflection, shown in solid lines. FIG. 6 also shows one of two extremes, that is, with relatively extreme deflection in broken lines. FIG. 5 is a plan view of the blade, illustrating node line 522, which is the location of each node in cross sections of the blade having deflections illustrated in FIG. 7. FIG. 7 shows both extremes of EB1 movement in broken lines. EB2 (2EB) (FIG. 8) is the EB mode with next longest wavelength and next shortest frequency and is characterized by two more spaced node lines 522A and 522B. Note there is no corresponding plan view illustrating the node lines 522A and 522B, though the locations of the two horizontal node lines relative to the blade height is readily apparent. EB3 (FIG. 9) is a further EB mode and illustrates three node lines 522A, 522B, and 522C.

Figure 11:
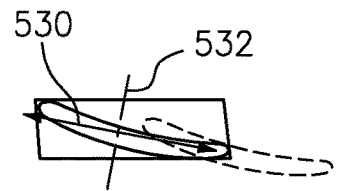
FIG. 11 is an inward view of the blade of FIG. 10 with a rearward vibrational extreme shown in broken lines.
Figure 10:
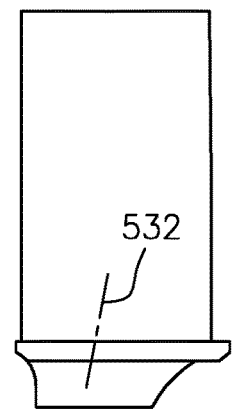
FIG. 10 is a side view of a blade showing a first stiffwise bending mode node line.

The stiffwise bending (SWB) modes (FIGS. 10&11) are essentially normal to the EB modes, and along the chord of the airfoil. The SWB resonance frequencies will be higher than the corresponding EB resonance frequencies. As with FIG. 6, FIG. 11 shows bi-directional movement in a direction 530 with one extreme (a trailing-edge shifted extreme) shown in broken lines relative to a solid line neutral condition. The node line is shown as 532. As with EB modes, there are a series of stiffwise bending modes, including 1SWB (SWB1), 2SWB (SWB2), etc.

Figure 13:
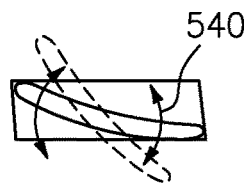
FIG. 13 is an inward view of the blade of FIG. 12, with one torsional extreme shown in broken lines.
Figure 12:
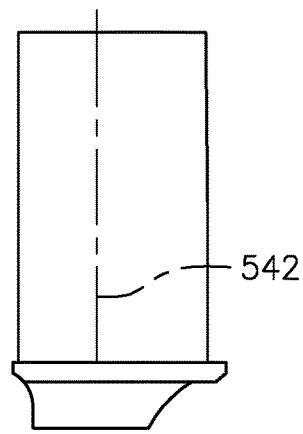
FIG. 12 is a side view of a blade showing a torsion mode node line.

The twist or torsion (T) modes (FIGS. 12&13) involve bi-directional twist in direction 540 twist generally about a spanwise axis for the airfoil, which is a radial axis from the center of the turbine, or node line 542. As with FIGS. 6 and 11, one torsional extreme is shown in broken lines with the neutral, deflection free condition shown in solid lines as shown in FIG. 13. As with EB modes, there are a series of torsion modes, including 1T, 2T, etc.

Trailing edge bending (TEB) modes (not shown) are bending modes that bend primarily along the trailing edge. There are other modes. As a general matter, however, the lowest resonance frequency is expected to be that of the EB1 mode. The remaining details of blade configuration may influence the relative positioning of the remaining modes.

Figure 14:
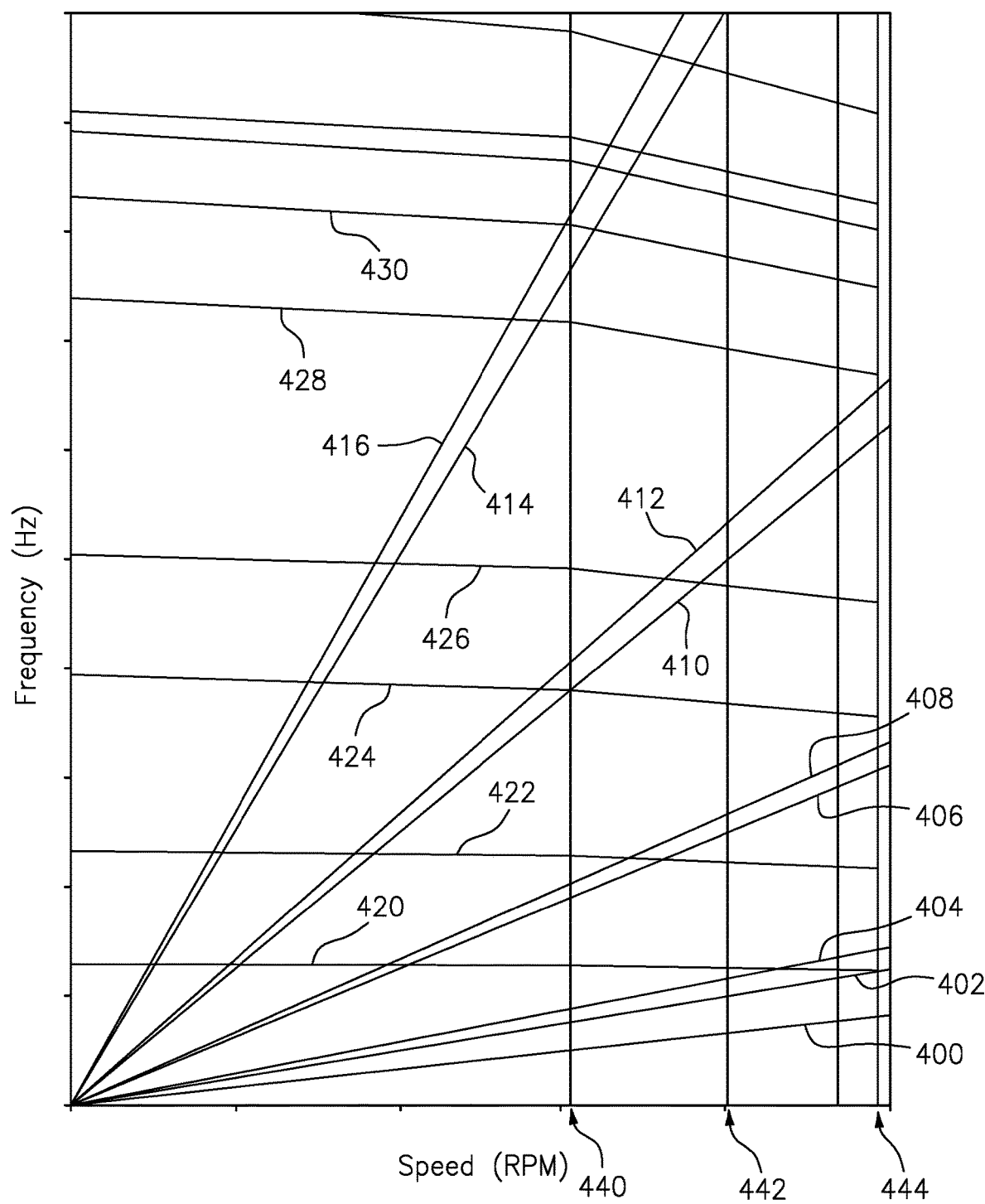
FIG. 14 is a Campbell diagram of the blade of FIG. 1.

Table I below and FIG. 14 provide parameters of the particular resonance profile:

TABLE I

| Mode | FIG. 14 | Zero Speed Nominal Freq. (Hz) | Idle Nominal Freq. (Hz) | Min Cruise Nominal Freq. (Hz) | Redline Nominal Freq. (Hz) |
| --- | --- | --- | --- | --- | --- |
| 1EB | 420 | 2591.5 | 2585.4 | 2558.5 | 2533.0 |
| 1SWB | 422 | 4675.2 | 4590.1 | 4467.5 | 4351.1 |
| 1T | 424 | 7892.9 | 7625.9 | 7369.0 | 7125.3 |

TABLE I-continued

| Mode | FIG. 14 | Zero Speed Nominal Freq. (Hz) | Idle Nominal Freq. (Hz) | Min Cruise Nominal Freq. (Hz) | Redline Nominal Freq. (Hz) |
|---|---|---|---|---|---|
| 2EB | 426 | 10098.2 | 9848.0 | 9537.6 | 9243.2 |
| 2T | 428 | 14808.2 | 14385.1 | 13895.4 | 13430.8 |
| 2TEB | 430 | 16667.5 | 16157.9 | 15570.4 | 15013.1 |

Tolerance for the nominal frequencies around these nominal values at each of these speeds is ±10%, more narrowly, ±5%. Exemplary zero speed frequencies are at ambient conditions (e.g., 20-28° C.). For the engine using this airfoil element, exemplary running speeds are: idle speed is 15278 rpm+5%; min. cruise speed is 20074 rpm+5%; and redline speed is 24624 rpm+5%.

While resonance frequencies are a function of the blade length, stiffness, and mass, they also represent the unique design characteristic of the blade. During the blade design, the resonance frequencies may be modified by selective modification of the blade airfoil root stiffness, length, chord, external thickness, or internal features (such as but not limited to rib location/thickness, or wall thickness, etc). Such change the resonance frequencies would render it acceptable for continued operation in the field without high vibratory stresses which can result in high cycle fatigue cracking. One skilled in vibration analysis and design would understand that these resonance frequency characteristics are unique for each blade and should account for, for example, the specific operational vibratory environment.

FIG. 14 is a Campbell diagram, with frequency and rotational speed on the axes, plot the resonant frequencies for the blade against engine rotor speed. That is, the Campbell diagram illustrates the unique frequency characteristics of the blade and captures the vibratory environment of the blade. The resonant frequencies change with speed because of the increased temperature (reducing resonance frequency) and centrifugal stiffening (increasing the resonance frequency). The resonance frequencies (which, as indicated, are unique for each airfoil) are represented by essentially horizontal lines 420, 422, 424, 426, 428, and 430. These respectively illustrate, against the engine rotor speed, the frequency of the $1^{st}$ easy-wise bending (1EB), $1^{st}$ stiff-wise bending, $1^{st}$ torsion (1T), $2^{nd}$ easy-wise bending (2EB), $2^{nd}$ torsion (2T), and $2^{nd}$ trailing edge bending (2TEB) vibratory modes, summarized in Table I. The Campbell diagram has angled lines 400, 402, 404, 406, 408, 410, 412, 414, and 416. These angled lines represent the excitation from upstream and downstream stationary airfoils or other interruptions in the flowpath that the blade feels as it rotates past the stationary airfoils.

For example, lines 400, 402, and 404 may be components of a once per revolution excitation. The source of this excitation is white noise from the burner. The blades can feel this excitation for excitation orders 1E, 2E, 3E, 4E, and 5E. Lines 400, 402, and 404, represent 4E, 6E, and 7E, respectively. In any flowpath, there are general aerodynamic disturbances which the blades feel at multiples of the rotor spin frequency. 1E is "once per revolution" or the rotor spin frequency (in cycles per second). The blades feel multiples of this once per revolution.

As illustrated for the blade, the 6E (402), and 7E (404) excitation orders are plotted on the Campbell diagram and are a concern because there are resonance crossings with the first bending mode (line 420) at high speed. The 4E line (line 400) does not have a crossing and is of less significance.

In addition, lines 410 and 412 respectively are excitation functions that are proportional to the vane counts of the vane stages immediately upstream and downstream of the blade stage in question. Lines 414 and 416 are twice 410 and 412 excitations and are relevant to Fourier decomposition of excitations. Lines 406 and 408 are proportional to counts of downstream struts (which are big structural airfoils that are part of the bearing supports; in this example, the strut count is different on two halves of the engine circumference).

Where the resonance frequency lines (represented by lines 420, 422, 424, 426, 428, and 430) intersect the excitation lines (represented by the angled lines 400, 402, 404, 406, 408, 410, 412, 414, and 416) a resonant condition occurs, which, as indicated, may result in high vibratory stress. The present blade characteristics have been selected such that vibratory modes, which may result in high vibratory stresses at a resonant condition, have been modified. Accordingly, the modes do not occur in the normal engine operating speed range (near idle (line 440)) and between minimum engine cruise (line 442) and redline (line 444). Vibratory modes, which are not predicted to have a high resonance response, are allowed to have a resonance condition in the normal operating range. As indicated, these evaluations may account for some or more of flowpath temperature and pressure, airfoil length, speed, etc. As a result of the evaluation and the subsequent iterative redesign of the blade, is a blade which is unique for a specific engine in a specific operating condition.

During the design, the blade must be tuned such that the resonance points do not occur in the operating speed range of the engine. To tune the blade, the resonance frequency must be changed, for example, by varying the blade length thickness, moment of inertia, or other parameters. These parameters are modified until the graphical intersections representing unwanted resonance occur outside the operating speed range, or at least outside key operating conditions within the operating speed range. This should be done for each the first five (or more) vibratory modes of the airfoil, and the blade should be tuned for varying excitation sources.

In FIG. 14, the idle speed is shown as 440, the minimum cruise speed is shown as 442, and the redline speed is shown as 444. Idle speed is important because the engine may spend much time at idle. Turning out resonance at min cruise and redline speeds are important because engines typically cannot avoid these speeds. A resonance at an excitation frequency at an intermediate speed may be avoided by slightly increasing or decreasing speed.

As an example from FIG. 14, it is seen that there are two resonance conditions. That is, the $1^{st}$ stiff-wise bending resonance mode (line 422) crosses two excitation lines, which are lines 406 and 408. These two resonance conditions occur between the engine idle speed (line 440) and the engine minimum cruise speed (line 442). This is an acceptable location for a resonance to occur and is unique for this blade in this engine.

The frequency response may also be relevant in the repair or remanufacture of blades. There are a number of possible repair and remanufacture techniques, each of which may have a different effect on frequency response. Examples include tip preform repairs and weld buildup repairs (e.g., laser cladding). Due to a need or desire to maintain airfoil external contour, there may be little leeway on the airfoil. Thus, candidates for tuning a remanufactured blade particularly include modifications to the platform. Hardware experiments or modelling may associate a number of particular tuning modifications (e.g., adding a discrete amount of material to or removing a discrete amount of material from a certain location on the platform) with respective changes in frequency response.

Accordingly, after damage or after an initial repair (e.g. restoring airfoil substrate and coating) frequency response measurements may be made. If blade response falls outside of specified tolerance, the nature of the deviations may inform the selection of the type, location, and magnitude of the particular tuning modification. For example, a database of modifications may associate addition of a particular amount of material at a particular location with a particular change in response. Using that database, a computer may select a particular tuning modification or combination to bring the blade within spec. The modification(s) may then be performed and, optionally, the blade retested and further modified if needed.

One or more embodiments have been described. Nevertheless, it will be understood that various modifications may be made. For example, when implemented as a reengineering of one of a baseline engine, details of the baseline engine may influence details of any particular implementation. Accordingly, other embodiments are within the scope of the following claims.

What is claimed is:

1. A method for remanufacturing a turbomachine airfoil element, the element comprising an airfoil having an inboard end, an outboard end, a leading edge, a trailing edge, a pressure side, and a suction side, a span between the inboard and an outboard end being 1.4-1.6 inch, a chord length at 50% span being 0.9-1.4 inch, the method comprising:
receiving a blade in a first condition; and
remanufacturing the blade to a second condition, the remanufacturing providing at least two of:
a first mode resonance frequency is 2591.5±10% Hz;
a second mode resonance frequency is 4675.2±10% Hz;
a third mode resonance frequency is 7892.9±10% Hz;
a fourth mode resonance frequency is 10098.2±10% Hz; and
a fifth mode resonance frequency is 14808.2±10% Hz.

2. The method of claim 1 wherein the manufacturing comprises addition of superalloy.

3. The method of claim 2 wherein the manufacturing comprises removal of material after the addition.

4. The method of claim 2 wherein the manufacturing comprises measuring a frequency response after the addition and thereafter further modifying the airfoil via removing or adding superalloy.

5. The method of claim 2 wherein:
the provided airfoil element has at least one unrestored mode frequency that is attributable to damage to the airfoil element; and
the at least one of the first mode frequency, second mode frequency, third mode frequency, fourth mode frequency, fifth mode frequency, and sixth mode frequency corresponds to a restored mode frequency that supersedes the unrestored mode frequency.

6. The method of claim 2 further comprising:
applying a thermal barrier coating over the added superalloy.

7. The method of claim 6 wherein airfoil element comprises:
a substrate having a density of 0.30-0.34 pounds per cubic inch.

8. The method of claim 1 wherein all of said first, second, third, fourth, and fifth mode resonance frequencies are present.

9. The method of claim 1 wherein: the first mode is a 1EB mode; the second mode is a 1SWB mode; the third mode is a 1T mode; the fourth mode is an 2EB mode; and the fifth mode is a 2T mode.

10. The method of claim 1 wherein: a sixth mode resonance frequency is 16667.5±10% Hz.

11. The method of claim 1 wherein: said resonance frequencies are at zero speed and ambient conditions.

12. The method of claim 1 wherein, at a running speed/condition:
the first mode resonance frequency is 2585.4±10% Hz;
the second mode resonance frequency is 4590.1±10% Hz;
the third mode resonance frequency is 7625.9±10% Hz;
the fourth mode resonance frequency is 9848.0±10% Hz; and
the fifth mode resonance frequency is 14385.1±10% Hz.

13. The method of claim 1, the element being a blade having an inboard attachment root.

14. The method of claim 13 wherein: the outboard end is a free tip.

15. The method of claim 1, the element being a casting.

16. The method of claim 1, the element formed of a nickel-based superalloy.

17. The method of claim 16, the element further comprising: a cooling passageway system in the airfoil.

18. The method of claim 17 wherein the cooling passageway system comprises:
one or more inlets; and one or more outlets.

19. The method of claim 18 wherein:
the nickel-based superalloy has a density of 0.30-0.34 pounds per cubic inch.

20. The method of claim 1 wherein:
a first mode resonance frequency is 2591.5±5% Hz;
a second mode resonance frequency is 4675.2±5% Hz;
a third mode resonance frequency is 7892.9±5% Hz;
a fourth mode resonance frequency is 10098.2±5% Hz; and
a fifth mode resonance frequency is 14808.2±5% Hz.

21. A method for remanufacturing a turbomachine airfoil element, the element comprising an airfoil having an inboard end, an outboard end, a leading edge, a trailing edge, a pressure side, and a suction side, a span between the inboard and an outboard end being 1.4-1.6 inch, a chord length at 50% span being 0.9-1.4 inch, the method comprising:
addition of superalloy; and
removal of material after the addition, the remanufacturing providing at least two of:
a first mode resonance frequency is 2591.5±10% Hz;
a second mode resonance frequency is 4675.2±10% Hz;
a third mode resonance frequency is 7892.9±10% Hz;
a fourth mode resonance frequency is 10098.2±10% Hz; and
a fifth mode resonance frequency is 14808.2±10% Hz.

22. A method for remanufacturing a turbomachine airfoil element, the element comprising an airfoil having an inboard end, an outboard end, a leading edge, a trailing edge, a pressure side, and a suction side, a span between the inboard and an outboard end being 1.4-1.6 inch, a chord length at 50% span being 0.9-1.4 inch, the method comprising:

addition of superalloy; and measuring a frequency response after the addition and thereafter further modifying the airfoil via removing or adding superalloy, the remanufacturing providing at least two of:
- a first mode resonance frequency is 2591.5±10% Hz;
- a second mode resonance frequency is 4675.2±10% Hz;
- a third mode resonance frequency is 7892.9±10% Hz;
- a fourth mode resonance frequency is 10098.2±10% Hz; and
- a fifth mode resonance frequency is 14808.2±10% Hz.

\* \* \* \* \*